(12) United States Patent
Hafeez et al.

(10) Patent No.: US 10,764,024 B2
(45) Date of Patent: Sep. 1, 2020

(54) MULTI-BEAM LISTEN BEFORE TALK

(71) Applicant: AT&T INTELLECTUAL PROPERTY I, L.P., Atlanta, GA (US)

(72) Inventors: Abdulrauf Hafeez, Cary, NC (US); Thomas Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/868,735

(22) Filed: Jan. 11, 2018

(65) Prior Publication Data

US 2019/0215140 A1 Jul. 11, 2019

(51) Int. Cl.
| | |
|---|---|
| *H04L 5/18* | (2006.01) |
| *H04W 72/08* | (2009.01) |
| *H04W 72/04* | (2009.01) |
| *H04W 74/08* | (2009.01) |
| *H04L 5/14* | (2006.01) |

(52) U.S. Cl.
CPC ............. *H04L 5/18* (2013.01); *H04W 72/046* (2013.01); *H04W 72/048* (2013.01); *H04W 72/082* (2013.01); *H04W 74/0808* (2013.01); *H04L 5/1461* (2013.01)

(58) Field of Classification Search
CPC .. H04L 15/18; H04W 72/046; H04W 72/048; H04W 72/082
See application file for complete search history.

(56) References Cited

U.S. PATENT DOCUMENTS

| | | | |
|---|---|---|---|
| 6,980,023 | B1 * | 12/2005 | Wong .................. H03K 19/003 |
| 8,086,239 | B2 | 12/2011 | Elmaleh |
| 8,619,805 | B2 | 12/2013 | Flammer, III |
| 9,730,220 | B2 | 8/2017 | Bhorkar et al. |
| 9,888,389 | B2 | 2/2018 | Bendlin et al. |

(Continued)

FOREIGN PATENT DOCUMENTS

| | | |
|---|---|---|
| WO | 2016048798 A1 | 3/2016 |
| WO | 2016072908 A1 | 5/2016 |

(Continued)

OTHER PUBLICATIONS

Nekovee, et al. "Self-organized beam scheduling as an enabler for coexistence in 5G unlicensed bands." IEICE Transactions on Communications 100.8 (2017): 1181-1189.

(Continued)

*Primary Examiner* — Ronald B Abelson
(74) *Attorney, Agent, or Firm* — Amin, Turocy & Watson, LLP

(57) ABSTRACT

Various embodiments disclosed herein provide for a multi-beam Listen Before Talk which is a coexistence mechanism used by wireless technologies such as Wi-Fi, to access unlicensed shared spectrum, such as the ISM UNIT bands (5 GHz). The embodiments disclosed herein enable a transceiver to determine whether or not there is activity on a beam to avoid causing interference. The transceiver can determine that there is activity in a certain direction, and then avoid transmitting on a beam in that direction until the activity ceases. While there is activity in a first beam, the transceiver can continue to transmit on other beams that will not cause interference with a transmission associated with the first beam.

21 Claims, 10 Drawing Sheets

(56) References Cited

U.S. PATENT DOCUMENTS

| | | | |
|---|---|---|---|
| 9,924,511 B2 | 3/2018 | Tavildar et al. | |
| 10,142,986 B2 | 11/2018 | Yu et al. | |
| 10,462,820 B2 | 10/2019 | Shi et al. | |
| 2005/0052950 A1* | 3/2005 | Klinnert | G01S 7/52 |
| 2013/0003803 A1 | 1/2013 | Ferguson | |
| 2016/0143014 A1 | 5/2016 | Mukherjee et al. | |
| 2016/0174258 A1* | 6/2016 | Wang | H04W 74/08 |
| 2016/0174259 A1 | 6/2016 | Mukherjee et al. | |
| 2016/0278125 A1 | 9/2016 | Liao et al. | |
| 2016/0373940 A1* | 12/2016 | Splitz | H04W 24/02 |
| 2016/0381707 A1 | 12/2016 | Figueiredo et al. | |
| 2017/0019909 A1 | 1/2017 | Si et al. | |
| 2017/0079032 A1 | 3/2017 | Li et al. | |
| 2017/0094681 A1 | 3/2017 | Takeda et al. | |
| 2017/0188387 A1 | 6/2017 | Mukherjee et al. | |
| 2017/0202022 A1 | 7/2017 | Chendamarai et al. | |
| 2017/0223635 A1 | 8/2017 | Dinan | |
| 2017/0231003 A1 | 8/2017 | Godana et al. | |
| 2017/0265214 A1 | 9/2017 | Hessler et al. | |
| 2017/0325263 A1 | 11/2017 | Liu et al. | |
| 2018/0054835 A1 | 2/2018 | Fodor et al. | |
| 2018/0063799 A1 | 3/2018 | Sadek et al. | |
| 2018/0092043 A1 | 3/2018 | Yerramalli et al. | |
| 2018/0092121 A1 | 3/2018 | Hessler et al. | |
| 2018/0103386 A1 | 4/2018 | Harada et al. | |
| 2018/0109957 A1 | 4/2018 | Fan et al. | |
| 2018/0115996 A1* | 4/2018 | Si | H04W 74/08 |
| 2018/0132236 A1* | 5/2018 | Kadous | H04W 72/0446 |
| 2018/0139782 A1 | 5/2018 | Sadek et al. | |
| 2018/0160452 A1 | 6/2018 | Patil et al. | |
| 2018/0176787 A1 | 6/2018 | Fakoorian et al. | |
| 2018/0184302 A1 | 6/2018 | Zhang et al. | |
| 2018/0184457 A1* | 6/2018 | Islam | H04W 74/08 |
| 2018/0206127 A1 | 7/2018 | Zhang et al. | |
| 2018/0213560 A1* | 7/2018 | Naghshvar | H04W 74/0808 |
| 2018/0235010 A1 | 8/2018 | Harada et al. | |
| 2018/0241526 A1 | 8/2018 | Chendamarai Kannan et al. | |
| 2018/0242232 A1 | 8/2018 | Chendamarai Kannan et al. | |
| 2018/0288625 A1 | 10/2018 | Chandrasekhar et al. | |
| 2018/0309479 A1 | 10/2018 | Yerramalli et al. | |
| 2018/0343588 A1 | 11/2018 | Sadek et al. | |
| 2018/0343676 A1 | 11/2018 | Yerramalli et al. | |
| 2018/0352520 A1* | 12/2018 | Zhang | H04W 52/40 |
| 2019/0373635 A1 | 12/2019 | Yang et al. | |
| 2020/0037366 A1 | 1/2020 | Cui | |

FOREIGN PATENT DOCUMENTS

| | | |
|---|---|---|
| WO | 2016197315 A1 | 12/2016 |
| WO | 2017020243 A1 | 2/2017 |
| WO | 2017121460 A1 | 7/2017 |
| WO | 2017/173133 A1 | 10/2017 |
| WO | 2017191617 A1 | 11/2017 |
| WO | 2017191939 A1 | 11/2017 |
| WO | 2017220237 A1 | 12/2017 |
| WO | 2018/059512 A1 | 4/2018 |
| WO | 2018067226 A1 | 4/2018 |

OTHER PUBLICATIONS

Song, et al. "Coexistence of Wi-Fi and cellular with listen-before-talk in unlicensed spectrum" IEEE Communications Letters 20.1 (2016): 161-164.

Chen, et al. "Downlink performance analysis of LTE and WiFi coexistence in unlicensed bands with a simple listenbefore-talk scheme." Vehicular Technology Conference (VTC Spring), 2015 IEEE 81st, 2015.

Li, Yuan, Juan Zheng, and Qiang Li. "Enhanced listen-before-talk scheme for frequency reuse of licensed-assisted access using LTE." Personal, Indoor, and Mobile Radio Communications (PIMRC), 2015 IEEE 26th Annual International Symposium, 2015.

Ko, et al. "A fair listen-before-talk algorithm for coexistence of LTE-U and WLAN." IEEE Transactions on Vehicular Technology 65.12 (2016): 10116-10120.

Jeon, et al. "LTE with listen-before-talk in unlicensed spectrum." Communication Workshop (ICCW), 2015 IEEE International Conference, 2015.

Kim, et al. "Adaptive listen-before-talk (LBT) scheme for LTE and Wi-Fi systems coexisting in unlicensed band" Consumer Communications & Networking Conference (CCNC), 2016 13th IEEE Annual, 2016.

3GPP, "3rd Generation Partnership Project; Technical Specification Group Radio Access Network; Study on Licensed-Assisted Access to Unlicensed Spectrum; (Release 13)," 3GPP TR 36.889 V0.0.2 (Oct. 2014), 9 pages.

Na et al., "Coexistence scheme of licensed-assisted access using long-term evolution and wireless local area network for wireless sensor networks", International Journal of Distributed Sensor Networks, DOI: 1550147717716814, vol. 13, No. 6, 2017, pp. 1-10.

Qualcomm, "Whal can we do with 5G NR Spectrum Sharing that isn't possible today?", Qualcomm Technologies, Inc., qualcomm.com, Dec. 13, 2017, 33 pages.

Bae et al., "Towards Harmonious Coexistence in the Unlicensed Spectrum: Rational Cooperation of Operators", Sensors 2017, vol. 17, No. 10, 2432, pp. 1-13.

Non-Final Office Action received for U.S. Appl. No. 16/277,707 dated Jun. 18, 2020, 17 pages.

\* cited by examiner

MULTI-BEAM LISTEN BEFORE TALK

TECHNICAL FIELD

The present application relates generally to the field of mobile communication and, more specifically, to implementing multi-beam Listen Before Talk (LBT), a radio frequency coexistence mechanism for a multi-beam beamformed wireless communications transmission in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
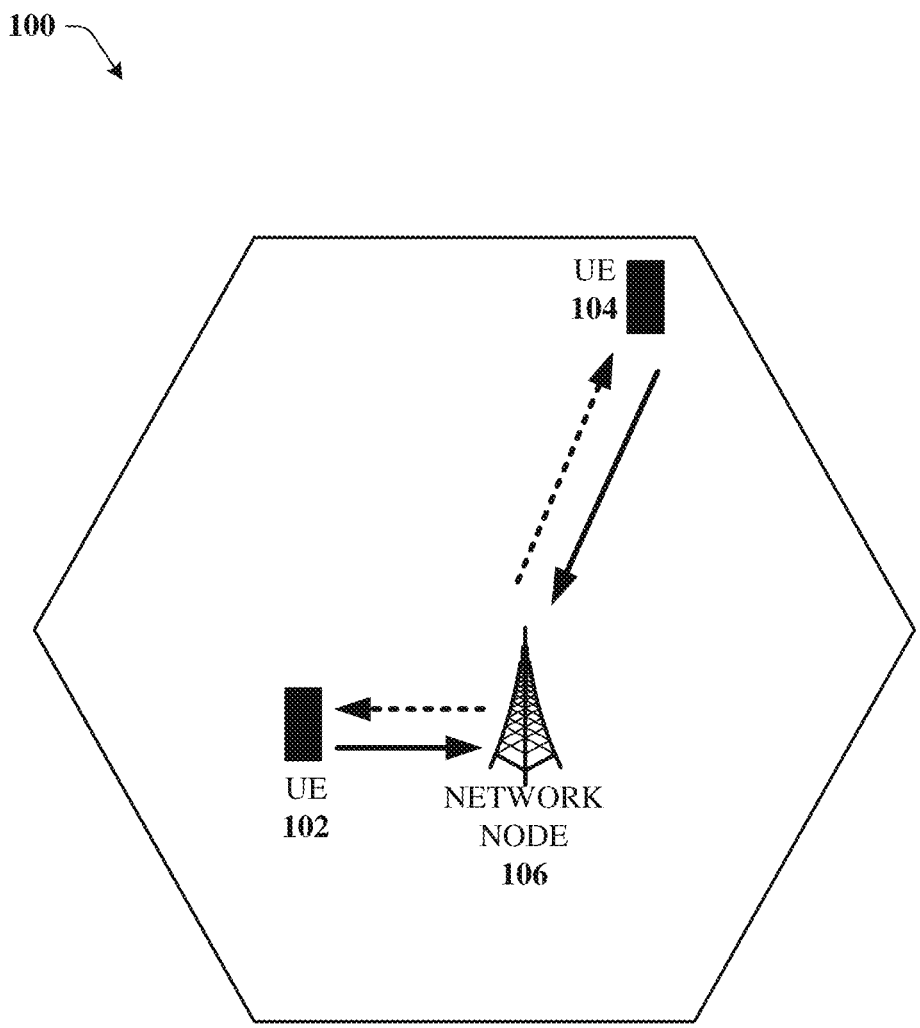
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a multi-beam Listen Before Talk which is a coexistence mechanism used by wireless technologies such as Wi-Fi, to access unlicensed shared spectrum, such as the ISM UNII bands (5 GHz). The embodiments disclosed herein enable a transceiver to determine whether or not there is activity on a beam to avoid causing interference. The transceiver can determine that there is activity in a certain direction, and then avoid transmitting on a beam in that direction until the activity ceases. While there is activity in a first beam, the transceiver can continue to transmit on other beams that will not cause interference with a transmission associated with the first beam.

As a coexistence mechanism LBT can be improved significantly with transmit and receive beamforming. 5G systems, especially for mmWave spectrum, will have a large number of antenna elements which could be used for analog, digital or hybrid beamforming. With Time Division Duplex (TDD) transmission, every transmit beam has a corresponding receive beam with identical characteristics. Using this property, a transceiver can tell if other users are active on some beams but not on other beams. This allows the transceiver to use the inactive beams for its transmissions, thus increasing channel reuse efficiency without causing interference. The invention provides a novel way to coexist for the future 5G networks employing large number of antenna elements. The benefits include higher throughputs, better user experience, lower latency and higher capacity. The novel technique may be implemented in future products to improve coexistence among equipment using the same technology or different technologies. It can also be considered as a mechanism for 5G random access.

In various embodiments, a base station device can comprise a processor and a memory that stores executable instructions that, when executed by the processor facilitate performance of operations. The operations can comprise detecting, in a first beam, an activity on a first channel, wherein the activity indicates a presence of radio interference on the beam, and wherein the first beam originates from a transmitter in a first direction. The operations can also comprise detecting, in a second direction, an absence of the activity on the first channel. The operations can also comprise in response to the detecting the activity on the first channel in the first direction and the detecting the absence of the activity in the second direction, transmitting a transmission on a transmission beam in the second direction.

In another embodiment, method comprises detecting, by a transceiver device comprising a processor, a transmission signature from a first transmitter in a first direction on a channel, wherein the first direction and the channel corresponds to a receive beam of a first time division duplex transmission. The method can also comprise determining, by the transceiver device, that no transmission has been received during a detection period from a second transmitter in a second direction on the channel, wherein the second direction and the channel corresponds to a receive beam of a second time division duplex transmission. The method can also comprise in response to the detecting and the determining, transmitting, by the transceiver device, a second transmission on a transmission beam associated with the second time division duplex transmission.

In another embodiment machine-readable storage medium, comprising executable instructions that, when executed by a processor of a device, facilitate performance of operations. The operations can comprise performing a first clear channel assessment in a first direction of a time division duplex channel, wherein the first direction corresponds to a first beam of a multiple input multiple output system associated with the time division duplex channel. The operations can also comprise, based on a first result of the first clear channel assessment indicating that the first direction has activity satisfying a criterion relating to interference, performing a second clear channel assessment in a second direction corresponding to a second beam of the multiple input multiple output system. The operations can also comprise, in response to the second clear channel assessment indicating that the second direction does not have the activity satisfying the criterion, facilitating a transmission on the second beam.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 or UE 102 and UE 104 can perform clear channel assessments (CCA) on beams to avoid sending a transmission on a beam that already has activity on the beam. In an embodiment, the multi-beam listen before talk is applicable to TDD equipment with a number of antenna elements capable of transmit and receive beamforming. We assume that each transmit beam of the equipment has a corresponding receive beam of the same equipment with identical propagation characteristics (gain, pattern, etc.), i.e. the two beams are reciprocal. Let B={$b_1$, $b_2$, ..., $b_K$} be a set of K beams supported by the equipment.

Narrowband or wideband beamforming can be employed although narrowband beamforming assumes that coexisting networks do not interfere with each other outside of the narrow band where multi-beam LBT is used. This has implications for network synchronization and use of compatible numerology.

Figure 2:
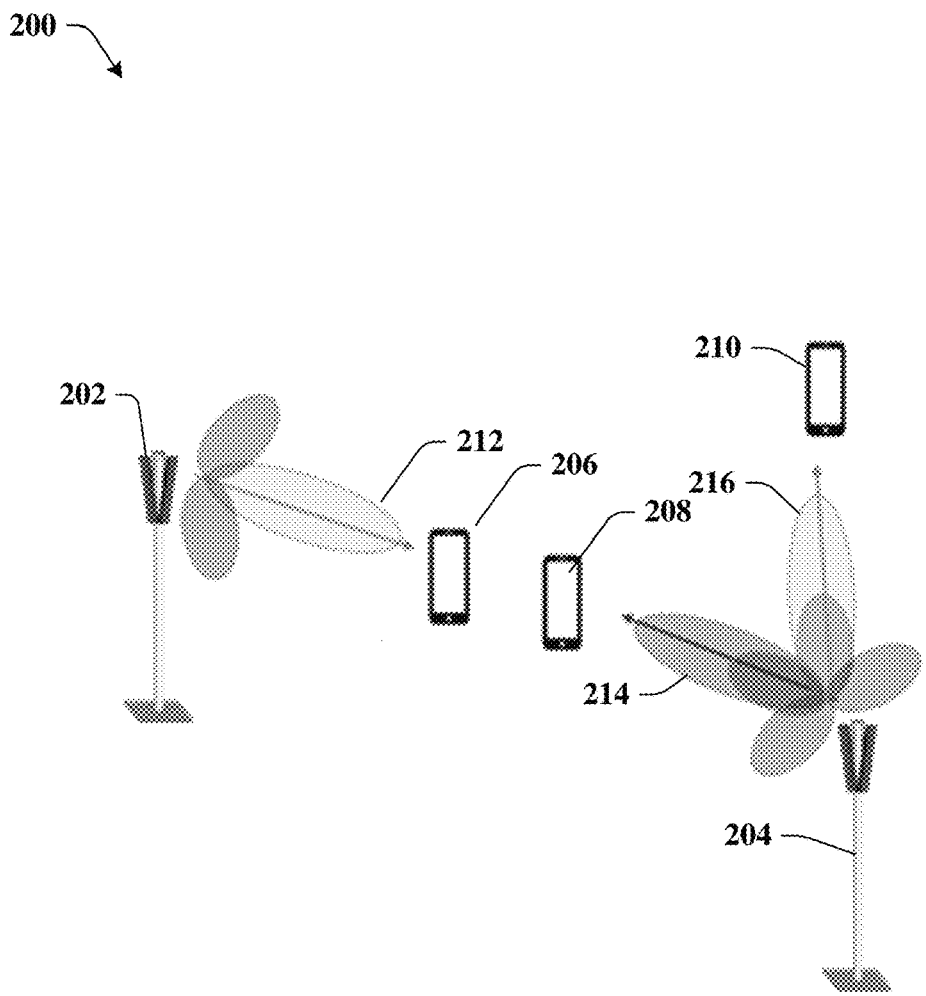
FIG. 2 illustrates an example block diagram showing multi-beam listen before talk in accordance with various aspects and embodiments of the subject disclosure.

Turning now to FIG. 2, illustrated is an example block diagram 200 showing multi-beam listen before talk in accordance with various aspects and embodiments of the subject disclosure In one embodiment, the transceiver 204 can perform LBT independently for all beams using receive beamforming. Let B be a subset of the set of B beams that are found to be clear for transmission. The equipment can use any one of the L beams in the subset B for transmission. The beam may be selected to maximize capacity or another performance metric for the intended receiver. The figure below shows a scenario where the base station device 204 detects channel activity from the base station device 202. Base station device 202 sends a transmission on beam 212 to device 206, and base station device 204 can detect energy or sense activity in the beam direction associated with beam 214, and so while activity is detected, the base station device will avoid transmitting to device 208, and will instead transmit to device 210 via beam 216, in which no activity is detected. Thus, base station device 204 can communicate with device 210 without causing interference for, or having interference caused by base station device 202's transmission to device 206 on beam 212.

It is to be appreciated that while FIG. 2 depicts base station device 202 and 204 performing the CCA for the multi-beam LBT procedure, in other embodiments UE devices, Wi-Fi routers, and any other transmitter/receiver can perform multi-beam LBT.

In an embodiment, channel activity can be detected (e.g., base station device 204 determining that base station device 202 is transmitting from the same direction as prospective beam 214) based on detecting energy in a receive beam. In other embodiments, if the base station device 204 is able to decode a preamble associated with the beam 212, then the base station device 204 can determine that there is channel activity such that transmitting to device 208 should be delayed until the activity has ceased.

The energy required to be detected for the base station device 204 to determine that activity is taking place can be a predetermined value that can be different based on different contexts. For instance, a wide beam can have a higher energy requirement than a narrow beam. Similarly, if a device to be communicated with is far away, a lower energy threshold can be set, while a closer device can have a higher energy threshold. The energy threshold can also vary based on the channel (e.g., frequency of the transmission), as well as based on the communication protocol and technology type (e.g., cellular, 5G, Wi-Fi, etc.).

In an embodiment, various forms of LBT can be employed. Each of the CCA parameters backoff counter, maximum channel occupancy time (MCOT) size, energy detection threshold, contention window maximum size may be configured jointly or independently for each of the multiple beams and or beam combinations or subsets thereof. Multi-beam LBT can be done at the transmitter end, the receiver end or both. This may for example correspond to the indication of one or more beam-pair-links (BPL) corresponding to a beam at the transmitter and a beam at the intended receiver. The CCA indication may be jointly or independently determined and exchanged between the transmitter and intended receiver (e.g. request to send and clear to send messages or signals) on the basis of one or more configured BPLs in case of Multi-beam LBT operation.

Multi-beam LBT can also be done for multiple frequency channels as in multi-channel LBT. In one example, the multi-beam and multi-channel LBT are performed independently (e.g. CCA is performed using all combinations of channels and beam/beam combinations). In another example, multi-beam and multi-channel LBT are performed jointly such that CCA is performed on a subset of possible combinations of channels and beams selected based on a criterion such as transmitter/receiver capabilities, performance metric, or regulatory constraints (e.g., max EIRP in a given bandwidth).

Figure 3:
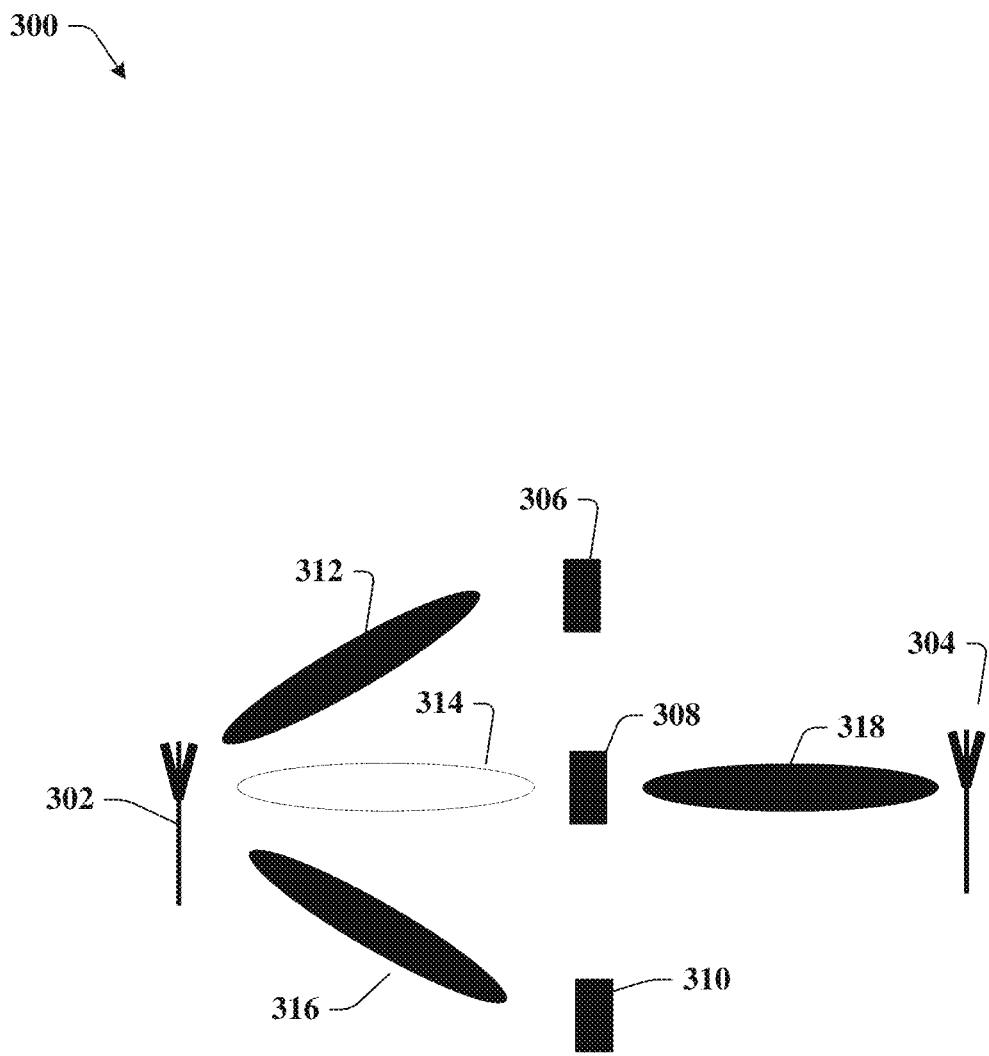
FIG. 3 illustrates an example block diagram showing joint multi-beam listen before talk in accordance with various aspects and embodiments of the subject disclosure.

Turning now to FIG. 3, illustrated is an example block diagram 300 showing joint multi-beam listen before talk in accordance with various aspects and embodiments of the subject disclosure.

In FIG. 3, base station device 302 can perform a CCA on a variety of beams and determine that beam 314 has activity detected from base station 304. Base station 304 can send a transmission on transmission beam 318 to device 308, and base station 302 can detect the activity (e.g., by the energy being above a predetermined threshold, or by being able to decode a preamble associated with transmission beam 318. Base station device 302 can determine however that beam directions associated with beams 312 and 316 are clear, and so while activity is detected in the beam direction associated with beam 314, base station device 302 can send transmissions via beams 312 and 316 to devices 306 and 310.

In an embodiment, the base station device 302 performs LBT jointly using various combinations of receive beams from the set B. Let C={$C_1, C_2, \ldots, C_N$} be a set of beam combinations from the set B that are found to be clear for transmission. A beam combination $C_i$ being cleared for transmission means that no channel activity was detected using any or all combination of beams contained in the beam combination. A beam combination may contain a single beam or multiple beams, i.e. $C_i=b_j, \{b_j,b_k\}$, or $\{b_j,b_k,b_l\}$, etc. In independent multi-beam LBT, beam combinations are restricted to a single beam only. The equipment can choose a beam combination for transmission which means that any or all of the beams contained in it can be used for transmission to an intended receiver or multiple intended receivers (using Multiuser-MIMO). The choice of beam combination may be based on maximizing system capacity, user capacity or another performance metric.

Figure 4:
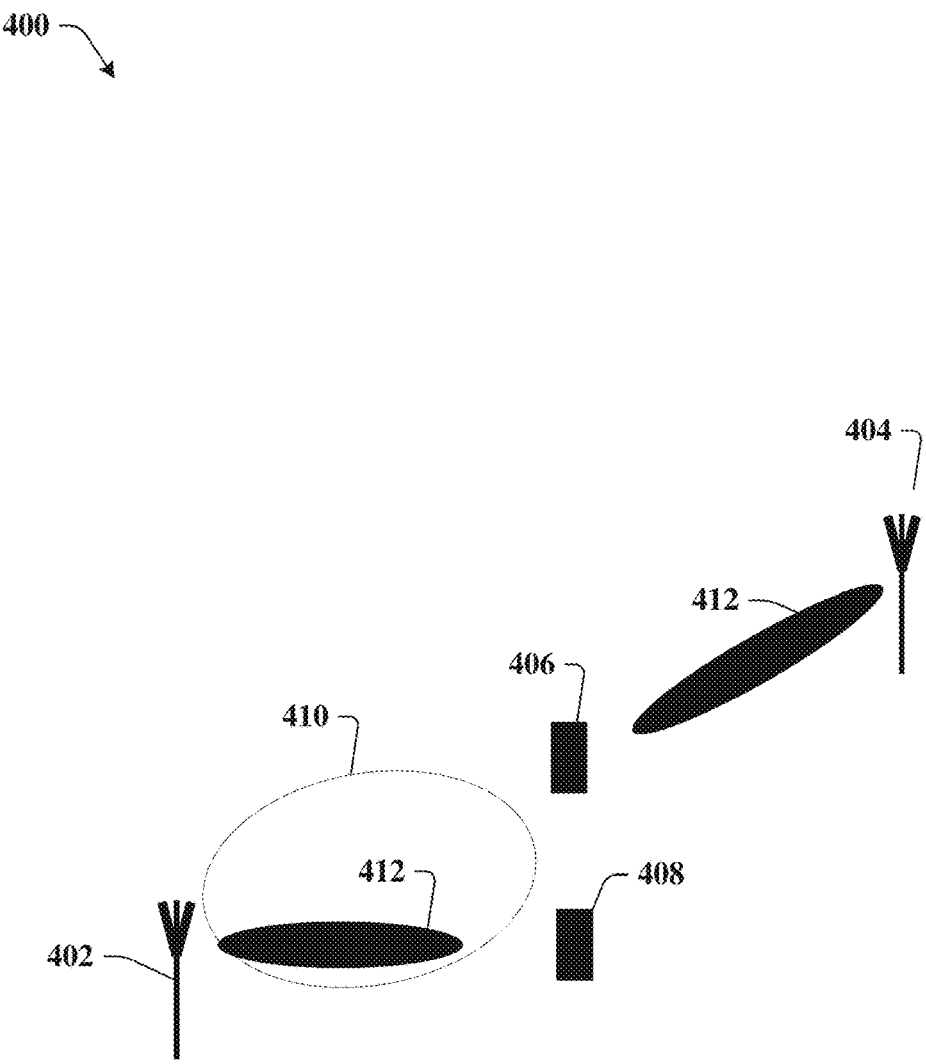
FIG. 4 illustrates an example block diagram showing hierarchical multi-beam listen before talk in accordance with various aspects and embodiments of the subject disclosure.

Turning now to FIG. 4, illustrated is another example embodiment of a diagram 400 showing hierarchical multi-beam listen before talk in accordance with various aspects and embodiments of the subject disclosure.

In an embodiment, different sets of beams or beam combinations may have beams with different parameters, such as beamwidth, directivity, gain, etc. For example, a first set of beams B~_wide may have a wide beamwidth (e.g. 60 degrees) while a second set of beams B~_narrow may have a narrow beamwidth (e.g. 15 degrees). The different sets may be implemented in such a way that multiple beams of the second subset partially overlap or fully lie within the beamwidth of a beam in the first subset (e.g. 4 narrow beams per wide beam in our example). Furthermore, multi-beam LBT may be performed across subsets in a hierarchical fashion. For example, CCA is first performed using wide beams and CCA is only performed using narrow beams if CCA using wide beams failed to clear for transmission. In another example, different beams may correspond to different supported transmissions. For example, wide beams may correspond to the transmission of synchronization signals and common control channels, while narrow beams may correspond to the transmission of UE-specific control and data channels.

Channel activity can be detected using energy detection or preamble detection. Cat 4 or other forms of LBT can be employed. Each of the LBT CCA parameters: backoff counter, MCOT size, energy detection threshold, contention window maximum size may be configured jointly or independently for each of the multiple beams and or beam combinations or subsets thereof. Multi-beam LBT can be done at the transmitter end, the receiver end or both. This may for example correspond to the indication of one or more beam-pair-links (BPL) corresponding to a beam at the transmitter and a beam at the intended receiver. The CCA indication may be jointly or independently determined and exchanged between the transmitter and intended receiver (e.g. request to send and clear to send messages or signals) on the basis of one or more configured BPLs in case of Multi-beam LBT operation.

Multi-beam LBT can be done for multiple frequency channels as in multi-channel LBT. In one example, the Multi-beam and multi-channel LBT are performed independently (e.g. CCA is performed using all combinations of channels and beam/beam combinations). In another example, multi-beam and multi-channel LBT are performed jointly such that CCA is performed on a subset of possible combinations of channels and beams selected based on a criterion such as transmitter/receiver capabilities, performance metric, or regulatory constraints (e.g. max EIRP in a given bandwidth).

In the embodiment shown in FIG. 4, a base station device 402 can monitor for activity in a direction associated with beam 410. Beam 410 can be a wide beam, and so can pick up energy being transmitted to device 406 from base station 404 via beam 412. Base station device 402 can delay transmitting information to both devices 406 and 408 via wide beam 410, and can instead just transmit to device 408 via narrow beam 412, which will not cause interference with beam 412, or have interference caused by beam 412.

Figure 5:
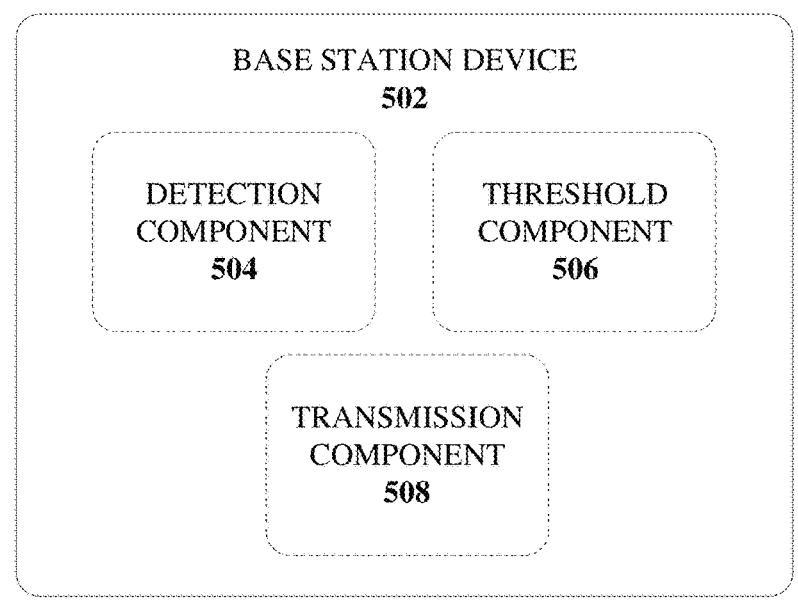
FIG. 5 illustrates an example block diagram of a base station device configured to perform multi-beam listen before talk in accordance with various aspects and embodiments of the subject disclosure.

Turning now to FIG. 5, illustrated is an example block diagram 500 of a base station device 502 configured to perform multi-beam listen before talk in accordance with various aspects and embodiments of the subject disclosure.

Base station device 502 can include a detection component 504 that can monitor for activity on a receive portion of a time division duplex beam based on detecting energy in the beam. In other embodiments, if detection component 504 is able to decode a preamble associated with the beam, then the detection component 504 can determine that there is channel activity such that transmitting to the user equipment device should be delayed until the activity has ceased.

The energy required to be detected for the detection component 504 to determine that activity is taking place can be a predetermined value that can be different based on different contexts. A threshold component 506 can determine the threshold level based on various contextual information. For instance, a wide beam can have a higher energy requirement than a narrow beam. Similarly, if a device to be communicated with is far away, a lower energy threshold can be set, while a closer device can have a higher energy threshold. The energy threshold can also vary based on the channel (e.g., frequency of the transmission), as well as based on the communication protocol and technology type (e.g., cellular, 5G, Wi-Fi, etc.).

A transmission component 508 can then transmit to any beam or combination of beams, or combination of beams and channels in which no activity was detected. The transmission component 508 can also send an indication to a user equipment device about the CCA indication to an intended recipient device on the basis of one or more configured beam pair links in the case of multi-beam operation.

Figure 6:
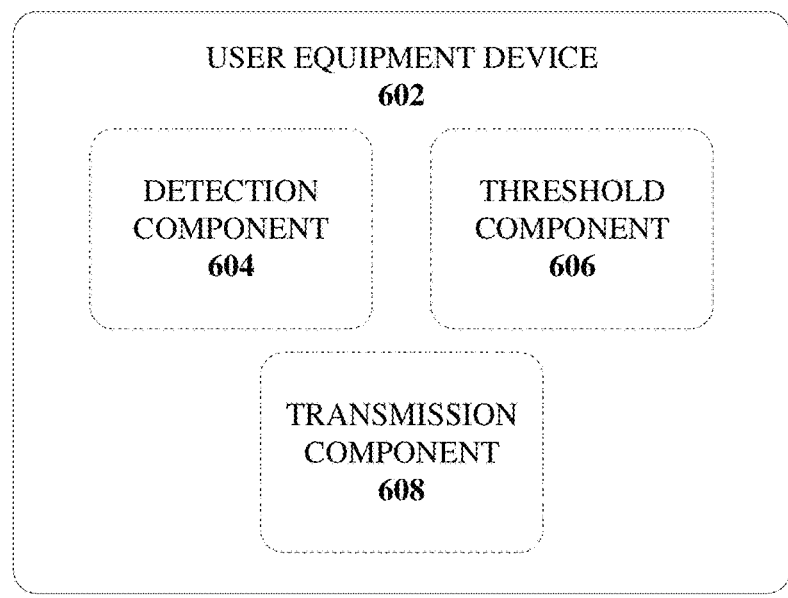
FIG. 6 illustrates an example block diagram of a user equipment device configured to perform multi-beam listen before talk in accordance with various aspects and embodiments of the subject disclosure.

Turning now to FIG. 6, illustrated is an example block diagram 600 of a user equipment device 602 configured to perform multi-beam listen before talk in accordance with various aspects and embodiments of the subject disclosure. The components in user equipment device 602 that perform the multi-beam LBT procedure can be similar to the components in base station device 502.

User equipment device 602 can include a detection component 604 that can monitor for activity on a receive portion of a time division duplex beam based on detecting energy in the beam. In other embodiments, if detection component 604 is able to decode a preamble associated with the beam, then the detection component 604 can determine that there is channel activity such that transmitting to the user equipment device should be delayed until the activity has ceased.

The energy required to be detected for the detection component 604 to determine that activity is taking place can be a predetermined value that can be different based on different contexts. A threshold component 606 can determine the threshold level based on various contextual information. For instance, a wide beam can have a higher energy requirement than a narrow beam. Similarly, if a device to be communicated with is far away, a lower energy threshold can be set, while a closer device can have a higher energy threshold. The energy threshold can also vary based on the channel (e.g., frequency of the transmission), as well as based on the communication protocol and technology type (e.g., cellular, 5G, Wi-Fi, etc.).

A transmission component 608 can then transmit to any beam or combination of beams, or combination of beams and channels in which no activity was detected. The transmission component 608 can also send an indication to a base station device about the CCA indication to an intended recipient device on the basis of one or more configured beam pair links in the case of multi-beam operation.

Figure 7:
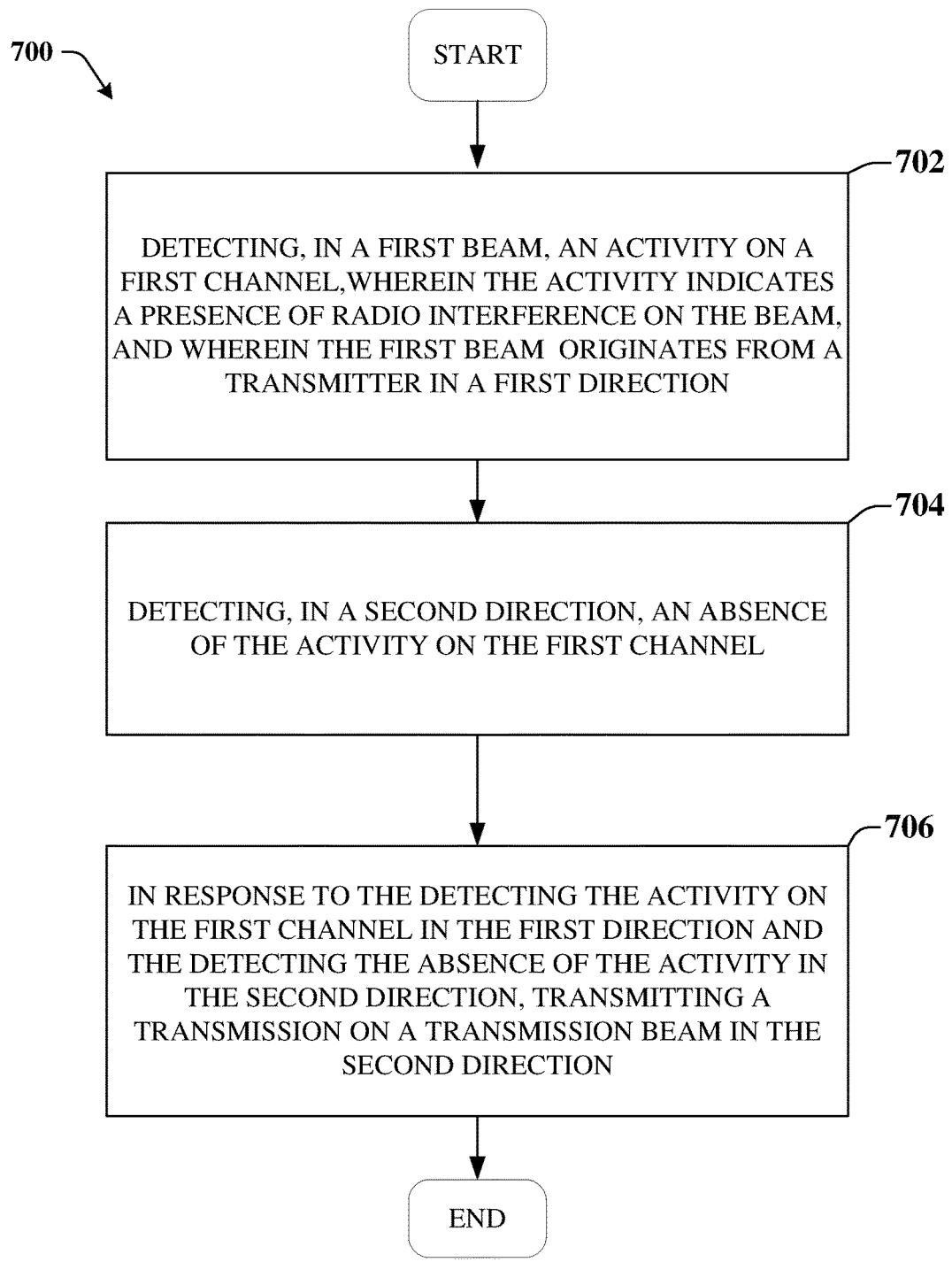
FIG. 7 illustrates an example method for performing multi-beam listen before talk in accordance with various aspects and embodiments of the subject disclosure.
Figure 8:
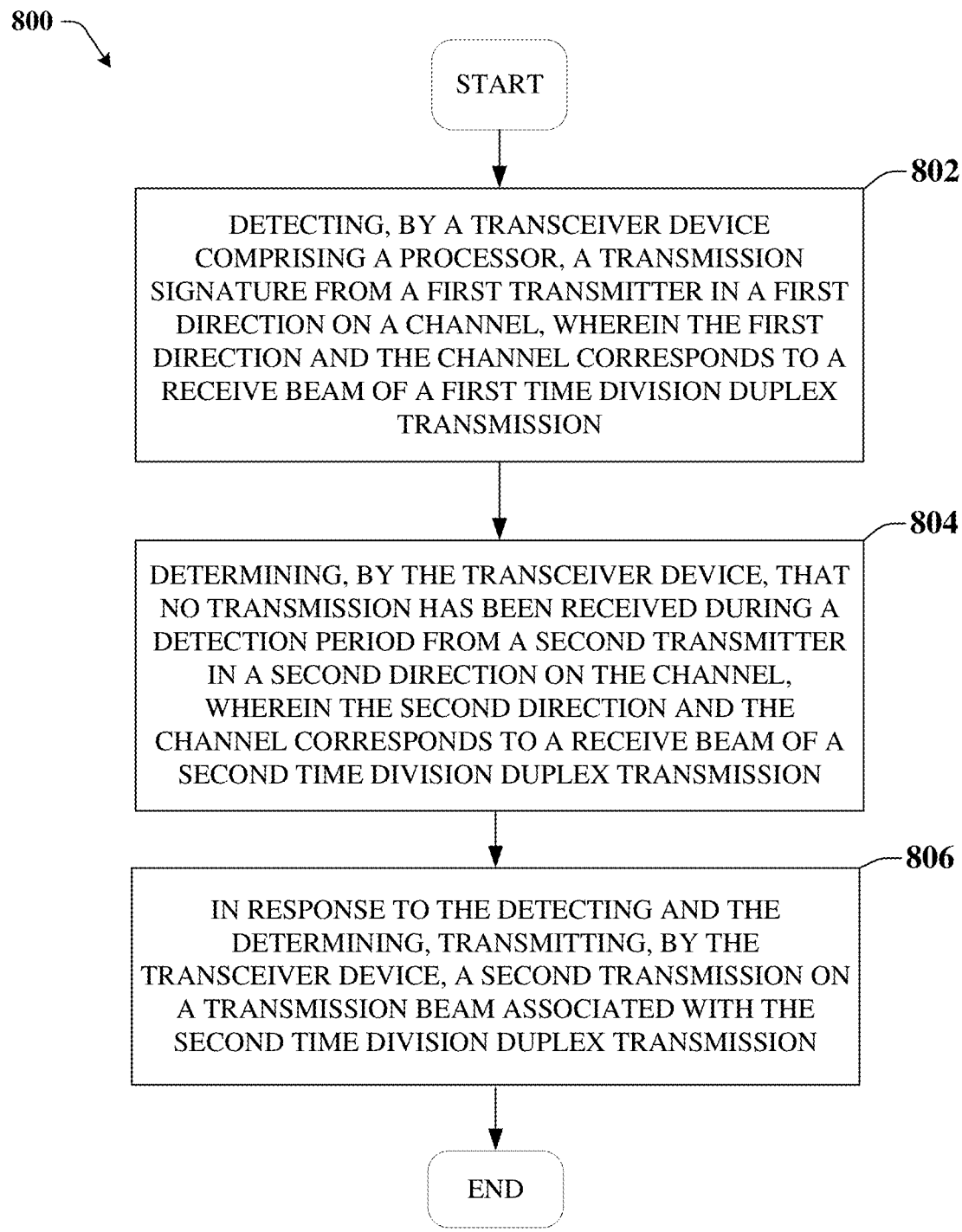
FIG. 8 illustrates an example method for performing multi-beam listen before talk in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for performing multi-beam listen before talk in accordance with various aspects and embodiments of the subject disclosure.

Method 700 can begin at 702 where the method includes detecting, in a first beam, an activity on a first channel, wherein the activity indicates a presence of radio interference on the beam, and wherein the first beam originates from a transmitter in a first direction.

At 704, the method includes detecting, in a second direction, an absence of the activity on the first channel.

At 706, the method includes in response to the detecting the activity on the first channel in the first direction and the detecting the absence of the activity in the second direction, transmitting a transmission on a transmission beam in the second direction.

FIG. 8 illustrates an example method 800 for performing multi-beam listen before talk in accordance with various aspects and embodiments of the subject disclosure.

Method 800 can begin at 802 wherein the method includes detecting, by a transceiver device comprising a processor, a transmission signature from a first transmitter in a first direction on a channel, wherein the first direction and the channel corresponds to a receive beam of a first time division duplex transmission.

At 804, the method can include determining, by the transceiver device, that no transmission has been received during a detection period from a second transmitter in a second direction on the channel, wherein the second direction and the channel corresponds to a receive beam of a second time division duplex transmission.

At 806, the method can include in response to the detecting and the determining, transmitting, by the transceiver device, a second transmission on a transmission beam associated with the second time division duplex transmission.

Figure 9:
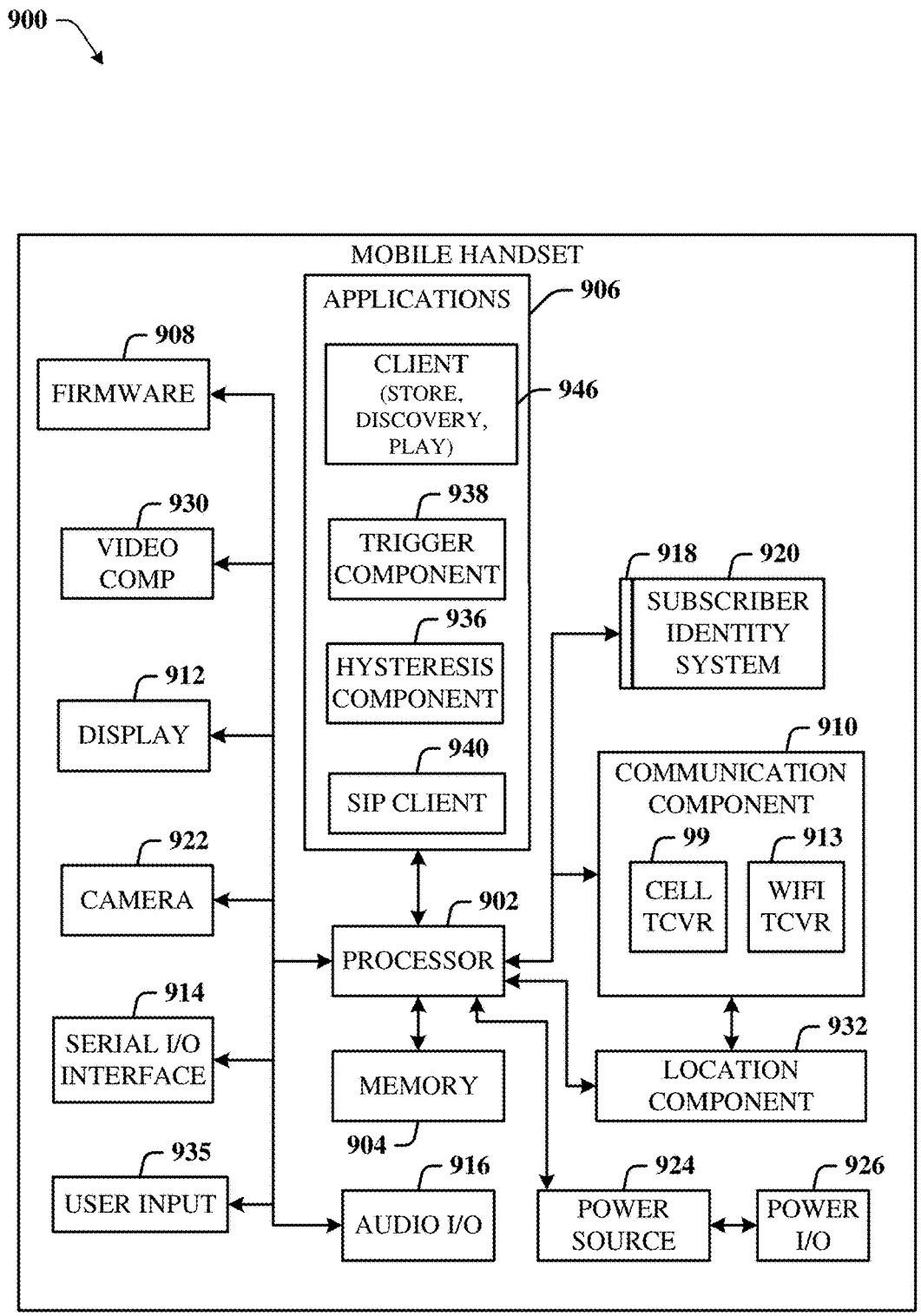
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
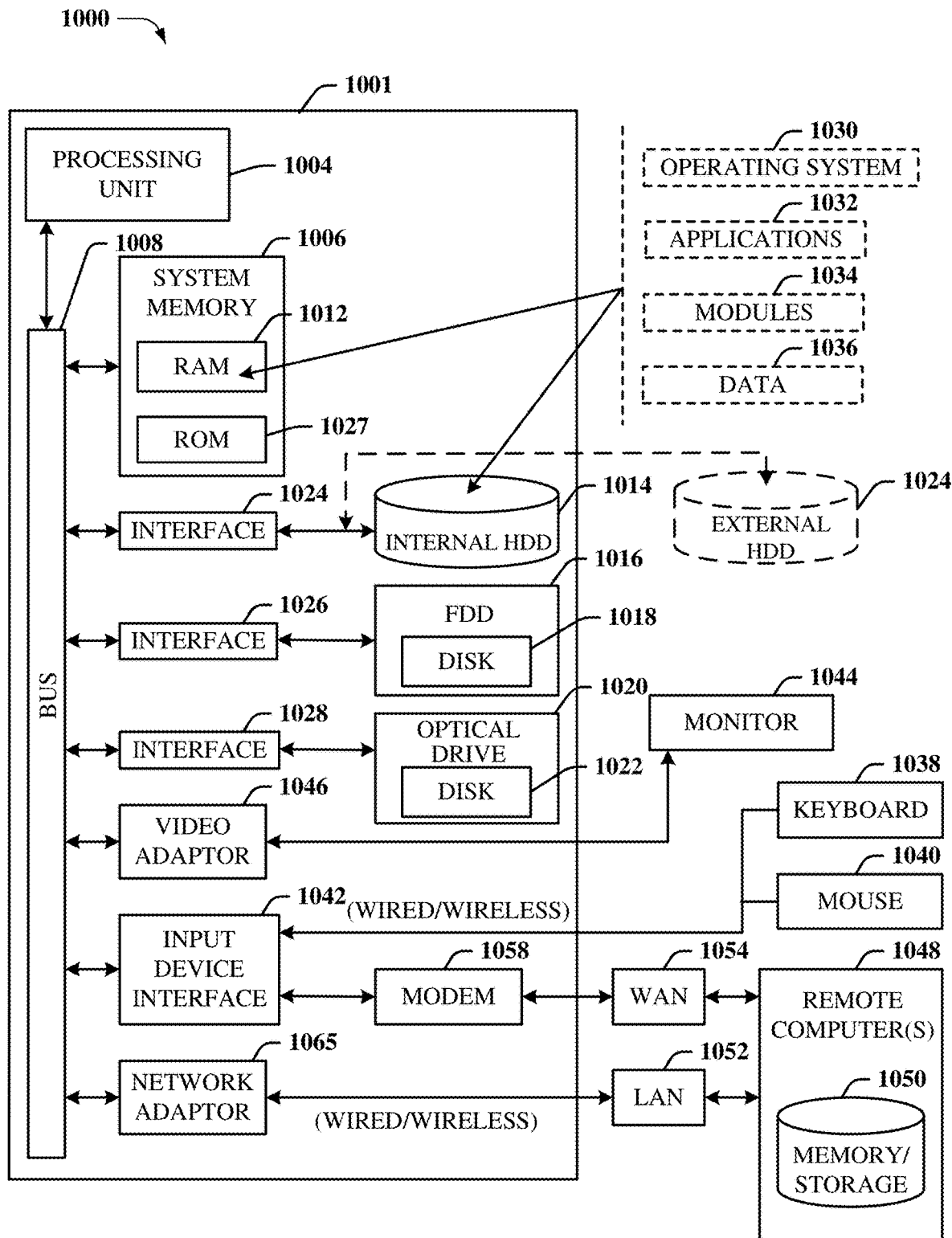
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, base station device 202, 204, e.g.,) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or framebased flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station device, comprising:
a processor; and
a memory that stores executable instructions that, when executed by the processor, facilitate performance of operations, comprising:
detecting, in a first beam, an activity on a first channel, wherein the activity indicates a presence of radio interference on the first beam, wherein the first beam originates from a transmitter in a first direction, wherein the detecting the activity comprises detecting the activity via a group of antenna elements that perform transmit and receive beamforming via time division duplexing, wherein the detecting the activity further comprises detecting the activity based on detecting energy on the first channel in the first direction above a defined threshold and based on decoding a preamble associated with a signal received on the first channel in the first direction, and wherein the defined threshold is based on a distance of the base station device from a receiver device associated with a transmission;
detecting, in a second direction, an absence of the activity on the first channel;
in response to the detecting the activity on the first channel in the first direction and the detecting the absence of the activity in the second direction, transmitting the transmission on a transmission beam in the second direction; and
in response to detecting no activity on the first channel for a group of directions, transmitting a group of transmissions on transmission beams in the group of directions, wherein the group of directions is selected based on a performance metric.

2. The base station device of claim 1, wherein the defined threshold is further based on a beam width associated with the first direction.

3. The base station device of claim 1, wherein the defined threshold is further based on a communication protocol associated with the transmission.

4. The base station device of claim 1, wherein the group of transmissions are directed at a receiver device.

5. The base station device of claim 1, wherein the group of transmissions are directed at a group of receiver devices.

6. The base station device of claim 1, wherein a first transmission beam of the transmission beams has a different beam parameter than a second transmission beam of the transmission beams.

7. A method, comprising:
detecting, by a transceiver device comprising a processor, a transmission signature from a first transmitter in a first direction on a channel, wherein the first direction and the channel correspond to a receive beam of a first time division duplex transmission, wherein the transmission signature has energy that satisfies a defined criterion associated with interference, and wherein the detecting the transmission signature comprises decoding a preamble associated with the receive beam of the first time division duplex transmission;

determining, by the transceiver device, that no transmission has been received during a detection period from a second transmitter in a second direction on the channel, wherein the second direction and the channel corresponds to a receive beam of a second time division duplex transmission;

in response to the detecting and the determining, transmitting, by the transceiver device, a second transmission on a transmission beam associated with the second time division duplex transmission; and in response to determining no activity via a group of receive beams, transmitting, by the transceiver device, a group of transmissions via a group of transmission beams.

8. The method of claim 7, wherein the group of transmission beams have different beam parameters.

9. The method of claim 7, further comprising:

selecting the group of transmission beams based on a performance metric associated with efficiency.

10. The method of claim 7, wherein the group of transmissions are directed to a receiver device.

11. The method of claim 7, wherein the group of transmission beams are directed to a group of receiver devices.

12. The method of claim 7, The base station device of claim 1, wherein a first transmission beam of the transmission beams has a different beam parameter than a second transmission beam of the transmission beams.

13. The method of claim 7, wherein the defined criterion is further based on a beam width associated with the first direction.

14. The method of claim 7, wherein the defined criterion is further based on a communication protocol associated with the first time division duplex transmission.

15. A machine-readable storage medium, comprising executable instructions that, when executed by a processor of a transceiver device, facilitate performance of operations, comprising:

detecting a transmission signature from a first transmitter in a first direction on a channel, wherein the first direction and the channel correspond to a receive beam of a first time division duplex transmission, wherein the transmission signature has energy above a defined criterion associated with interference, and wherein the detecting the transmission signature comprises decoding a preamble associated with the receive beam of the first time division duplex transmission;

determining that no transmission has been received during a detection period from a second transmitter in a second direction on the channel, wherein the second direction and the channel corresponds to a receive beam of a second time division duplex transmission;

in response to the detecting and the determining, transmitting a second transmission on a transmission beam associated with the second time division duplex transmission; and in response to determining that there is no activity on a group of receive beams, transmitting a group of transmissions on a group of transmission beams.

16. The machine-readable storage medium of claim 15, wherein the group of transmission beams have different beam parameters.

17. The machine-readable storage medium of claim 15, the operations further comprising:

selecting the group of transmission beams based on a performance metric associated with efficiency.

18. The machine-readable storage medium of claim 15, wherein the group of transmissions are directed to a receiver device.

19. The machine-readable storage medium of claim 15, wherein the group of transmission beams are directed to a group of receiver devices.

20. The machine-readable storage medium of claim 15, wherein the defined criterion is further based on a beam width associated with the first direction.

21. The machine-readable storage medium of claim 15, wherein the defined criterion is further based on a communication protocol associated with the first time division duplex transmission.

* * * * *